June 1, 1937.  J. A. LE CAIN  2,082,704

STEAM VALVE GEAR

Filed Feb. 14, 1933  6 Sheets-Sheet 1

John A. LeCain.
INVENTOR

BY
ATTORNEY

JOHN A. LeCAIN
INVENTOR
ATTORNEY

Patented June 1, 1937

2,082,704

UNITED STATES PATENT OFFICE 2,082,704

STEAM VALVE GEAR

John A. Le Cain, East Orange, N. J.

Application February 14, 1933, Serial No. 656,688

13 Claims. (Cl. 121—150)

This invention relates to steam valve gears, and an object of the invention is to provide an improved steam valve gear which is simple in construction, reliable and positive in action, has comparatively low manufacturing and maintenance costs, and which, among its many other advantages, embodies an improved method for steam cushioning the valve piston and the main or steam piston having prompt and quick reversals which will reduce the necessity for high peak piston speed to obtain a desired capacity, and one which will effect reduction in steam consumption.

With these and other objects in view, as may appear from the accompanying specification, the invention consists of various features of construction and combination of parts, which will be first described in connection with the accompanying drawings, showing a steam valve gear of the preferred form embodying the invention, and the features forming the invention will be specifically pointed out in the claims.

Figure 1:
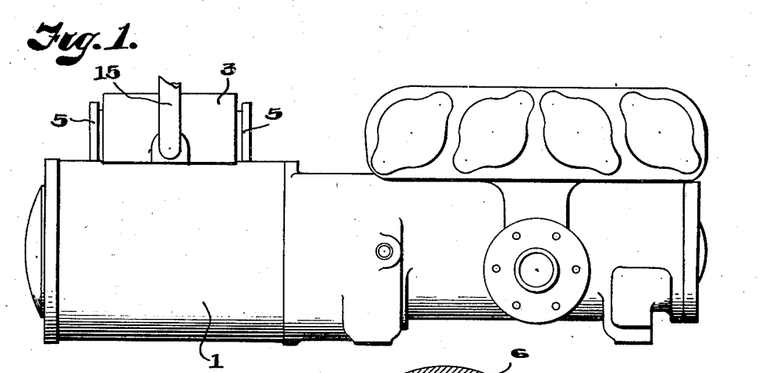
Fig. 1 is a plan view of a pump showing the improved steam valve gear applied thereto.
Figures 2, 8, 9, 10, 11:
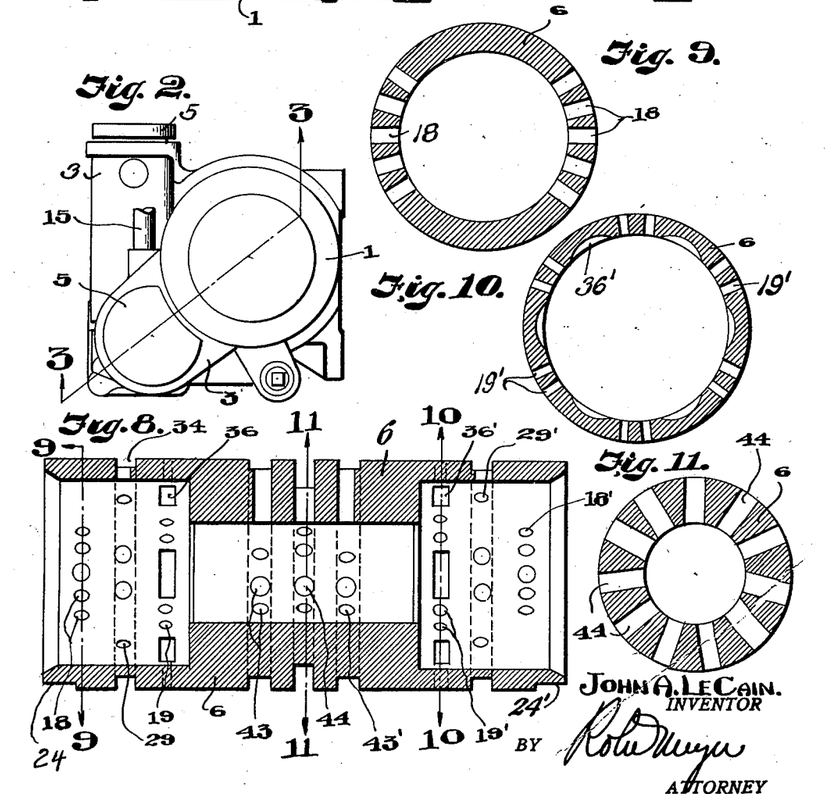
Fig. 2 is an end elevation of a pump showing the improved steam valve gear applied thereto.
Fig. 8 is a longitudinal section through the distributing sleeve of the steam valve gear.
Fig. 9 is a cross section through the sleeve of the steam valve gear taken on the line 9—9 of Fig. 8.
Fig. 10 is a cross section through the sleeve of the steam valve gear and taken on the line 10—10 of Fig. 8.
Fig. 11 is a cross section through the sleeve of the steam valve gear and taken on the line 11—11 of Fig. 8.
Figures 3, 4, 4C, 5:
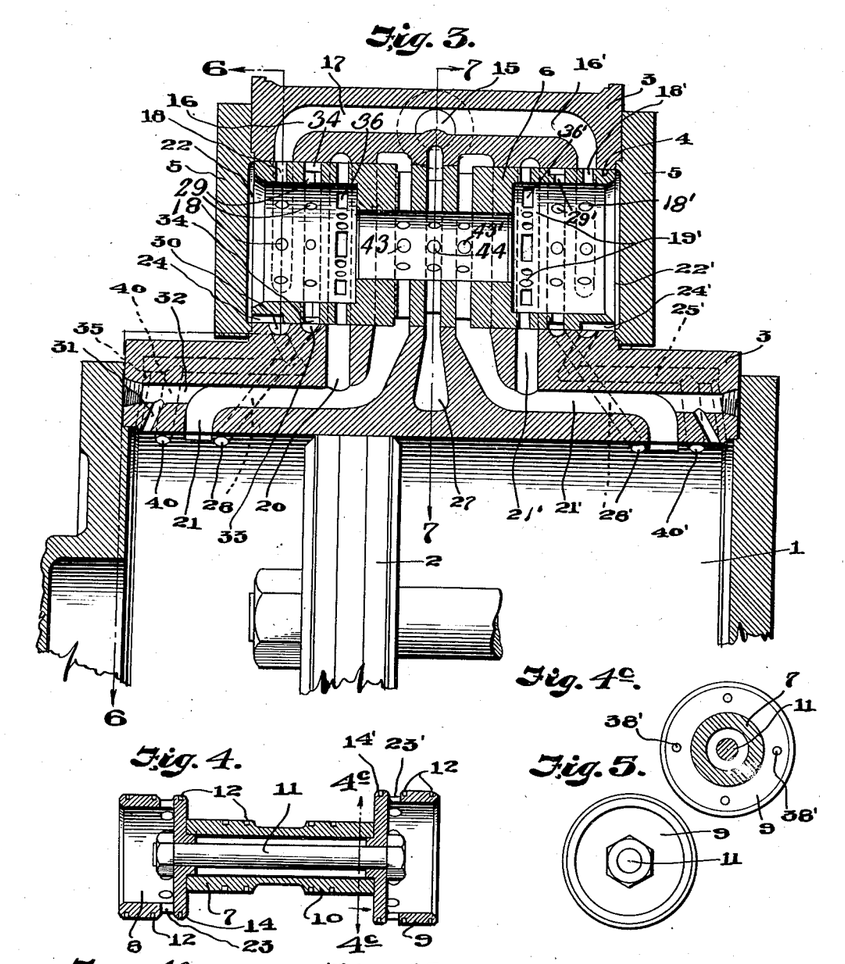
Fig. 3 is a longitudinal section through the steam valve gear taken on the line 3—3 of Fig. 2 and having the valve piston removed.
Fig. 4 is a longitudinal section through the valve piston.
Fig. 4C is a cross section through the valve piston taken on line 4C—4C of Fig. 4.
Fig. 5 is an end elevation of the valve piston.

Referring more particularly to the drawings, the improved steam valve gear is shown in Figs. 1 and 2 as applied to the steam end of a direct acting steam pump, although it is to be understood that it may be utilized in connection with any type of mechanism with which it is practical to associate it, without departing from the spirit of the invention.

It will also be noted by particular reference to the drawings, that the steam valve gear is in itself relatively simple, embodying only a single movable piston which reciprocates in a suitable distributing sleeve carried by the valve chest, and that through a series of ingeniously arranged ports the valve piston controls the admission and exhaust of steam into and from a steam cylinder 1, in which the steam piston 2 reciprocates.

The steam cylinder 1 has the valve chest 3 cast thereon or otherwise suitably attached thereto, and while this valve chest is shown at a particular angle in Figs. 1 and 2 of the drawings, it is to be understood that it may be arranged at any suitable angle desired.

The steam chest 3 is provided with a longitudinal axial bore 4, the ends of which are closed by removable heads 5. A steam distributing sleeve 6 is mounted in the bore 4 of the steam chest and the valve piston 7 reciprocates within the distributing sleeve, that is, acting or cooperating with the various ports (which will be hereinafter more specifically referred to) in the distributing sleeve for controlling the distribution of the steam.

The piston 7 is preferably made of head sections 8 and 9 and a connecting or center, section 10, all of which are connected by a suitable bolt 11. The piston structure 7 is provided with suitable piston rings 12 for the purpose of maintaining proper tight contact between the piston and the bore of the sleeve 6 during operation of the steam valve gear.

The various circumferentially spaced ports in the heads 8 and 9 of the piston 7 in the annular cut-out portion in the central portion 10 thereof, as well as the various ports in the distributing sleeve 6 and steam chest 3, will be specifically referred to in the description of the operation of the steam valve gear, where they will appear in their proper sequence, depending upon the various steps or stages in the operation of the steam valve gear.

Figures 12, 13:
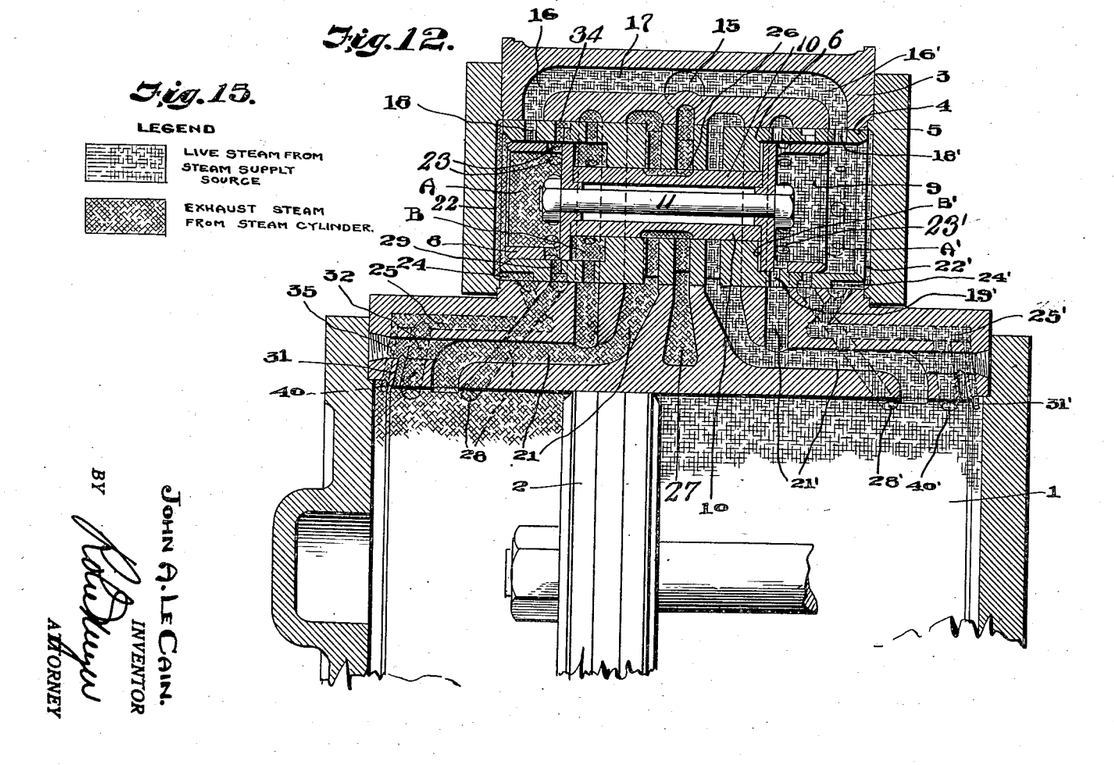
Figs. 12, 13 and 14 are diagrammatical, longitudinal sections through the steam valve gear and part of a steam piston showing various positions of the parts assumed during the operation of the steam valve gear.
Figure 14:
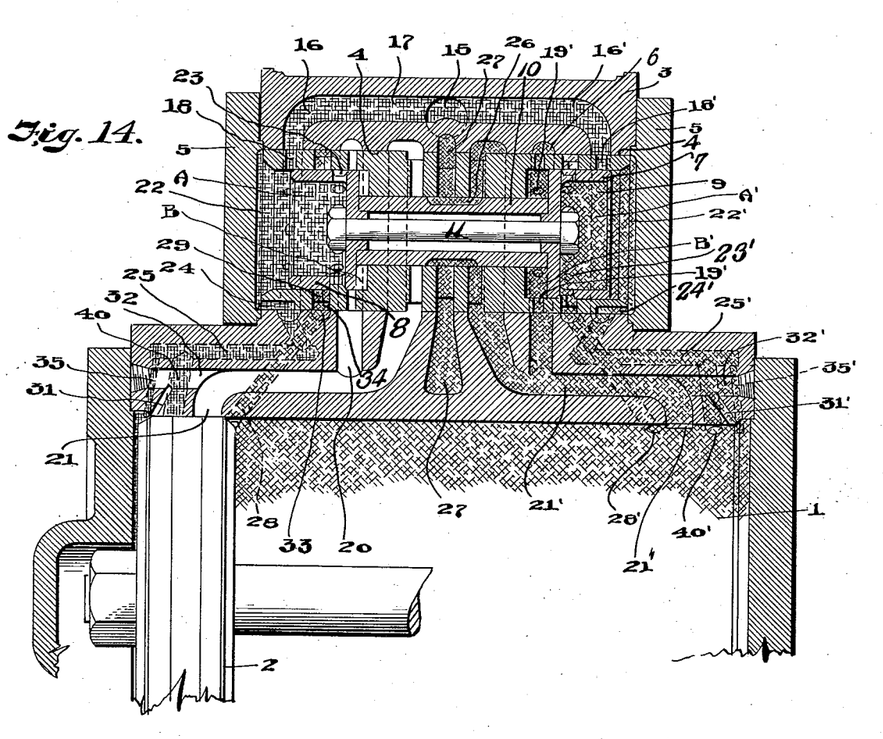
Figures 15, 16:
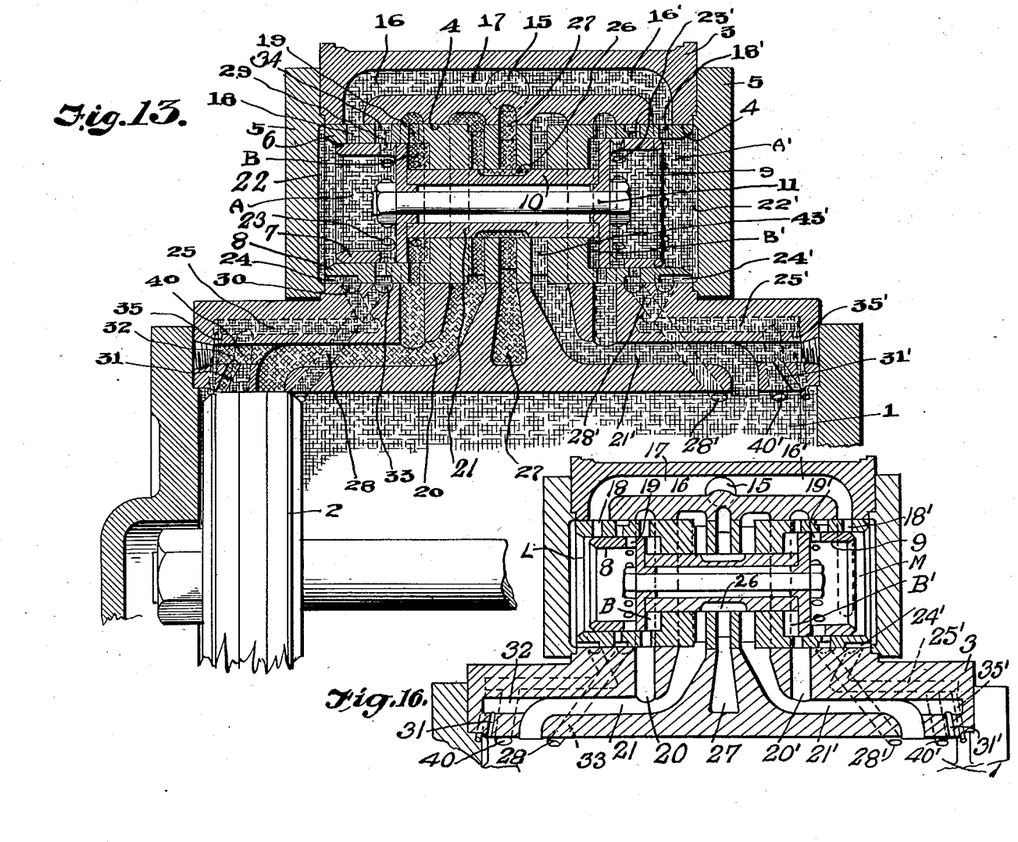
Fig. 15 is an explanatory view or legend explaining the color cross hatching in Figs. 12, 13 and 14.

In describing the method of operation of the improved steam valve gear, particular reference will be had to Figs. 12, 13 and 14 of the drawings, and referring particularly to Fig. 13, steam enters the steam chest from the steam inlet 15 and passes through the branches 16 and 16' of the steam inlet port 17. When the steam valve gear is in the position illustrated in Fig. 12 of the drawings, the steam piston 2 is in motion towards the left and the steam valve 7 is held in its extreme position to the left by the distribution of steam and exhaust pressures. At this time, the end 16 of the port 17 is closed by the head 8 of the valve or valve piston 7 and the opposite end 16' of the port 17 is opened and furnishing steam to move the steam piston 2. By particular reference to the drawings, it will be noted that the port 16' extends only part of the way around the periphery of the distributing bushing 6, leaving space at the bottom of the sleeve for a port which will be further described. The steam passing through the branch 16' of the port 17 passes through the openings 18' in the distributing sleeve 6, which openings 18' mesh with and form a continuation of the port 16'. The steam passing through the ports 18' enters the space A' in the end of the sleeve 6 and in the end or head 9 of the piston. The space A' and the corresponding space A at the opposite end of the sleeve 6 and valve 7 are formed by the enlarged bores in the ends of the sleeve 6 and by the counterboring of the piston heads 8 and 9. The large bores in the ends of the sleeve 6 also form the differential spaces or areas B and B'.

Figure 6:
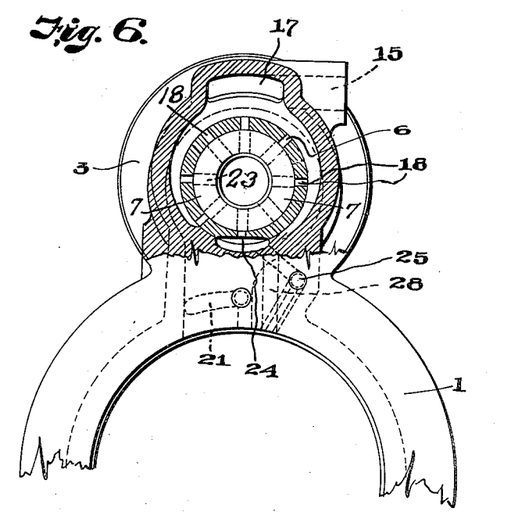
Fig. 6 is a vertical cross section through the improved steam valve gear and taken on the line 6—6 of Fig. 3.

Steam from the port 18' enters the space A' and passes through a series of openings 23' formed in the right hand end or head 9 of the steam valve, and through corresponding cooperating openings 19' in the sleeve or bushing 6, and thence through the main steam port 21' into the steam cylinder 1, and forces the steam piston 2 to the left. Steam from the space A' also passes downwardly through the space 22' at the end of the sleeve or bushing 6 into the space 24' which is formed by the cutting away of a part of the sleeve, as more clearly shown in Fig. 6 of the drawings. From the space 24' the steam passes into the port 25' and through this port 25' into the cylinder. The function of the port 25' will be hereinafter more fully set forth, particularly in the description of the operation of the valves, as shown in Figs. 13 and 14. Exhaust steam from in front of the steam piston 2 leaves the steam cylinder 1 through the main exhaust port 21 and the recess 26 formed in the valve 7 by the reducing of the diameter of the central portion of the valve, and passes out through the exhaust port 27 and the main exhaust outlet 13 (see Fig. 7).

Figure 7:
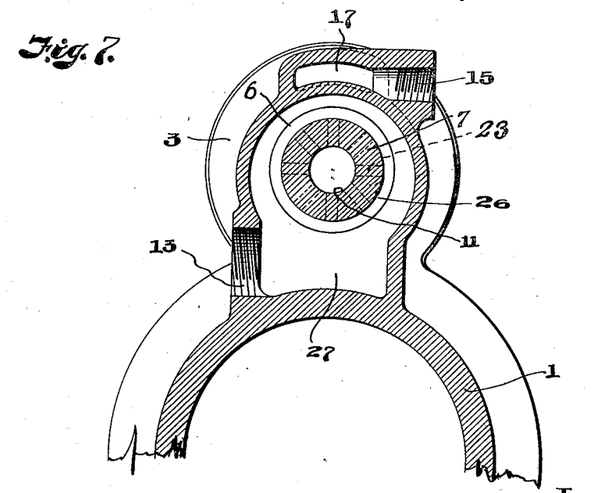
Fig. 7 is a vertical cross section through the valve gear taken on the line 7—7 of Fig. 3.

At this time, the space A at the left hand end of the steam valve 7 contains steam at exhaust pressure because it is connected to the steam cylinder 1 forwardly of the piston 2, and therefore indirectly to the main exhaust port 27 by the small starting port 28, and passages 22, 24, 25, 35 and 40, the detailed function of which port will be hereinafter more fully described. The differential space B at the left hand end of the steam valve gear is also connected to steam at exhaust pressure through the ports 19, 20, 21 and 27. The differential space A' at the right hand end of the sleeve or bushing 6 is connected to steam pressure through the port 16', as heretofore described, while the differential space B' has been closed or cut off from live steam supply because the steam valve 7 has moved or is in its extreme left position. As the valve 7 moves to the left approaching the position shown in Fig. 12 of the drawings, a certain amount of steam is trapped in the differential space B' and the compression of this steam serves to reduce the velocity of the steam valve 7 toward the left and assure its coming to rest quietly and without violent contact between the inner surface of the head and the shoulder on the sleeve or bushing 6.

From this distribution of steam and exhaust pressures in the spaces A, A', B and B', it will be noted that the steam valve 7 is held in its extreme position to the left during the stroke of the main piston 2 to the left, by a force equal to the cross sectional area of the inner ends or faces of the heads of the steam valve multiplied by the difference in pressure between steam and exhaust.

Figure 4A:
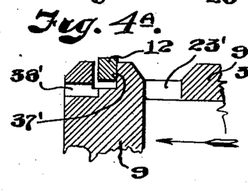
Fig. 4A is an enlarged detail of a part of the valve piston showing the parts in one position during the cycle of operation of the valve gear.
Figure 4B:
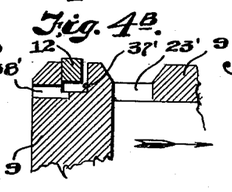
Fig. 4B is a detail section similar to Fig. 4A only showing the parts in another position reached at a predetermined point during each cycle of operation of the valve gear.

Leaving for the moment the steam valve 7 thus held in its extreme position toward the left, reference is now made to the steam piston 2 as it continues its motion toward the left from the position shown in Fig. 12 of the drawings. In moving towards the left, the steam piston 2 first covers the lower end of the starting port 28 and closes this port, but with no change in the distribution of steam and exhaust pressure. It will be noted, however, that this port 28 with its lower end open to the steam cylinder and therefore in communication with the port 21 and exhaust port 27, has been a factor in maintaining exhaust pressure in the space A because the upper end of the port 28 is in communication with the space A through the corresponding holes or openings 29 in the sleeve or bushing 6, and the holes or openings 23 in the piston head 8. As the steam piston 2 continues its motion toward the left, it next covers the lower end of the port 21 and traps steam in the steam cylinder 1 beyond this point, forming a cushion of compressed steam which gradually retards the motion of the steam piston 2. A small additional or auxiliary exhaust port 31 is provided which opens through a branch port 32 into the port 21 and this small auxiliary exhaust port 31 allows the gradual escape of the trapped exhaust steam in front of the piston 2 and permits the steam piston to continue its stroke at a reduced speed. When the piston 2 covers the lower end of the small port 31, the position shown in Fig. 13 of the drawings is reached, and the steam piston has passed beyond and opened the lower end of the port 28. Steam from behind the steam piston 2 then passes through the port 28 into the small recess or cavity 33 of the steam chest 3 and through the adjacent communicating annular groove 34 in the outer part of the bushing or distributing sleeve 6, the openings 29, the ports 23 and into the space A at the end of the steam valve 7, thereby supplying pressure steam instead of exhaust steam to the space A. The pressure steam then passes down around the end of the sleeve or bushing 6 into the space 24 which forms a port communicating with the cavity 30 formed in the steam chest and thus provides a passageway for the steam to the port 25 and through the port 25 into and through the small extension 35 into the cylinder 1 in front of the steam piston 2. By means of this small port 35 pressure steam from behind the piston passes to the other or front side of the piston, thus supplying live steam to the opposite side of the piston causing the piston to come to rest preparatory to an operating supply of live steam from other sources for the purpose of moving the piston on the return stroke. As stated above, the live steam from behind the piston which enters the lower end of the port 28 supplies live steam pressure to the space A. With live steam pressure in the space A and also in the space A′, the exhaust steam or exhaust pressure in space B and steam approximating live steam pressure in space B′, the steam valve 7 will start its motion towards the right. The chamber B′ is then supplied with steam pressure from the chamber or space A′ through the holes 38′ and the clearance between the ring 12 and the ring groove 37′ in the edge 14′ of the valve 7 as shown in Fig. 4A of the drawings. When the valve piston 7 is moving to the left the ring 12 contacts as shown in Fig. 4B and is therefore in position for compressing the steam in the space or chamber B′. The distribution of steam pressures just mentioned continues until the valve 7 reaches mid position and with its continued motion toward the right the distribution of steam and exhaust pressures as shown in Fig. 14 is obtained.

The annular cut-out portion 26 is of such length and the various ports are arranged in such manner that negative exhaust laps and positive steam laps are provided, so that at the time the valve piston 7 is passing its central position steam pressure will be exhausted from one cylinder port before the other cylinder port opens to steam pressure. This operation provides means for assuring a continuous force in the direction of the valve travel, thereby preventing the valve piston 7 from stalling in its central position, and will, when the steam throttle (not shown) is opened, in conjunction with the excess areas, (provided by the difference in size of the valve piston heads) cause the valve to move from any central position to the end of its stroke.

As described just above, the steam valve 7 was started on its motion towards the right by steam from behind the steam piston 2 which entered the lower end of the port 28 and reached the space A. With this continued motion towards the right, the port 16 is opened by the steam valve, thus permitting steam from the steam inlet 15 to reach the space A and continue the motion of the steam valve 7 to the right, but with this continued motion to the right the upper end of the port 28 is closed by the steam valve 7 and space A is then supplied with steam directly from the steam inlet 15 instead of from the cylinder 1 through the port 28. Referring particularly to Fig. 13; continued motion of the valve 7 towards the right first opens the ports 18 and 43′, and next closes the ports 18′ and 43. The opening of the port 43′ and closing of the port 18′ permits exhaust of steam from the right side of the steam piston 7 and from the spaces or chambers A′ and B′. As shown in Fig. 14 the space or chamber B contains steam at exhaust pressure and further movement of the valve piston 7 to the right opens the by-pass grooves 36, bypassing steam from the chamber or space A to the chamber or space B. Upon the closing of this by-pass the entrapped steam in the chamber or space B is compressed assuring the quiet coming to rest of the valve as heretofore described in reference to the movement of the valve piston 7 to the left. As shown in Fig. 14, the reversing port 29 is closed and steam from the port 18 is being supplied to the chamber or space A and to the left of the valve piston 7, while exhaust steam is being supplied to the right hand side of the valve piston 7 as above noted. The steam piston then starts on its motion to the right, receiving a gradually increasing amount of steam in succession through the ports 35 and 31 and the port 40 which opens into the port 25, and finally through the main steam port 21. With the steam piston 2 thus moving towards the right and the steam valve 7 having completed its stroke towards the right, a position is reached which is the direct opposite of that shown in Fig. 12 of the drawings, and at this time the condition of the steam in all of the ports at the left hand end of the steam valve gear is the same as the condition of the steam in the ports at the right hand end, as shown in Fig. 12 of the drawings, and vice versa.

It will be noted that in this condition wherein the steam valve 7 is held in its extreme position towards the right and the steam piston 2 is also in its motion towards the right, starting port 28′ has been left in communication through its upper end with the space A′, so that preparation has been made for supply of live steam from behind the steam piston 2 to the space A′, in order to start reversal of the valve as soon as the steam piston 2 reaches the right hand end of its stroke and uncovers the lower end of the port 28′.

The cycle of operation of the steam piston 2 and the valve 7 involves practically the steam piston moving towards the left while the steam valve is held in its left hand position, and the steam piston moving towards the right while the steam valve is held in its right hand position, the steam piston and steam valve thus practically alternating periods of rest and motion. This schedule of motion requires a certain distribution of steam pressure in the steam valve gear. It is possible, therefore, in a steam valve gear of this general type, that this distribution of pressure might be disturbed and the valve might refuse to start, and/or due to the valve piston being located at the center of its travel when attempt is made to start it. To prevent this possibility of stalling or failure to start of the steam valve gear, one end of the steam valve 7 is made of slightly large diameter than the other end, as is clearly shown in Figs. 4, 12, 13 and 14 of the drawings, which show the right hand end of the bushing or distributing sleeve 6 bored to a slightly larger diameter than the left hand end, and the head 8 of the steam valve 7 is correspondingly larger than the head 8 thereof. With this arrangement, when it is desired to start the mechanism with which the steam valve gear is associated and also the valve, and the supply of steam to the steam valve gear is opened, there will be a tendency of the valve to move in some direction because of the difference in areas of its two ends, and this motion will supply steam and exhaust pressures to various ports which might otherwise be disconnected, and thus normal operation will be resumed.

Besides the ports or openings 18, 18′, 29, 29′, 19 and 19′ in the distributing sleeve or bushing 6, series of suitable ports or openings 43, 43′ and 44 are provided in the sleeve or bushing 6, which permit multiple and thorough distribution of steam transversely through the sleeve to communicate with the respective differential spaces B and B', ports 21 and 21', and exhaust port 27.

It will be understood that the invention is not to be limited to the specific construction or arrangement of parts shown but that they may be widely modified within the invention defined by the claims.

What is claimed is:

1. In a steam valve gear, the combination with a steam cylinder having heads, and a piston movable therein, of a steam chest provided with ports and passages for controlling the admission of steam to and its exhaust from said cylinder, said chest provided with a longitudinal bore, a distributing sleeve in said bore and provided with openings communicating with said ports, a piston valve mounted for reciprocatory movement in said sleeve for controlling steam flow through said ports, said sleeve provided with cutaway portions forming spaces at its lower sides having steam-receiving communication with the ends of the sleeve, said steam chest provided with ports communicating with said spaces and having small auxiliary outlets into the steam cylinder at the extreme ends of the cylinder whereby live steam from the steam chest will be delivered to the steam cylinder between the head of the cylinder and the steam piston when the steam piston reaches the limit of its stroke.

2. In a steam valve gear, the combination with a steam cylinder having heads, and a piston movable therein, of a steam chest provided with ports and passages for controlling the admission of steam to and its exhaust from said cylinder, said chest provided with a longitudinal bore, a distributing sleeve in said bore and provided with openings communicating with said ports, a piston valve mounted for reciprocatory movement in said sleeve for controlling steam flow through said ports, said sleeve provided with cutaway portions forming spaces at its lower sides having steam-receiving communication with the ends of the sleeve, said steam chest provided with ports communicating with said space and having small auxiliary outlets into the steam cylinder at the extreme ends of the cylinder whereby live steam from the steam chest will be delivered to the steam cylinder between the head of the cylinder and the steam piston when the steam piston reaches the limit of its stroke, said steam chest provided with starting ports which are opened when the steam piston reaches the limit of its stroke to admit steam from the steam cylinder into the valve chest behind one end of the piston valve for starting the valve upon its reverse movement.

3. In a steam valve gear, the combination with a steam cylinder having heads, and a piston movable therein, of a steam chest provided with ports and passages for controlling the admission of steam to and its exhaust from said cylinder, said chest provided with a longitudinal bore, a distributing sleeve in said bore and provided with openings communicating with said ports, a piston valve mounted for reciprocatory movement in said sleeve for controlling steam flow through said ports, said sleeve provided with cutaway portions forming spaces at its lower sides having steam-receiving communication with the ends of the sleeve, said steam chest provided with ports communicating with said spaces and having small auxiliary outlets into the stream cylinder at the extreme ends of the cylinder whereby live steam from the steam chest will be delivered to the steam cylinder between the head of the cylinder and the steam piston when the steam piston reaches the limit of its stroke, said steam chest provided with starting ports which are opened when the steam piston reaches the limit of its stroke to admit steam from the steam cylinder into the valve chest behind one end of the piston valve for starting the valve upon its reverse movement, said steam inlet and exhaust ports and said valve arranged so that should the valve stop on its center small overlap openings to the steam supply and exhaust ports will be provided to permit restarting of the valve.

4. In a valve gear, a steam chest, a distributing sleeve in said chest, a piston valve mounted for reciprocatory movement in said distributing sleeve and comprising opposed heads, said steam chest and sleeve provided with ports for controlling the delivery of piston valve shifting steam to the piston valve, said sleeve counter-bored to form differential spaces inwardly of the ends of said heads, said heads provided with ports and said sleeve provided with cutout portions to admit steam to said differential spaces, and means on the heads for controlling delivery of steam to said differential spaces.

5. In a steam valve gear, a steam chest, a distributing sleeve in said chest, a piston valve comprising opposed heads mounted for reciprocatory movement in said distributing sleeve, said steam chest and sleeve provided with ports for controlling the delivery of piston valve shifting steam to the piston valve, said sleeve counter-bored to form differential spaces inwardly of the ends of said heads, said heads provided with ports and said sleeve provided with cutout portions to admit steam to said differential spaces, and rings slidably carried by said heads for controlling delivery of steam to said differential spaces.

6. In a steam valve gear, a combination with a steam cylinder and a steam piston, of a steam chest, a distributing sleeve in said chest, a piston valve having opposed heads and slidable in said sleeve, said chest provided with passages opening into the steam cylinder, said sleeve and piston heads provided with ports for registering at predetermined times with said passages to admit steam from the steam cylinder into said sleeve, said sleeve and chest provided with other ports and passages to deliver cushioning steam and initial movement imparting steam to said steam piston, and said sleeve provided with cut-away portions to permit steam from said first named passage to pass to and through said second named ports and passages.

7. In a steam valve gear, a combination with a steam cylinder and a steam piston, of a steam chest, a distributing sleeve in said chest, a piston valve having opposed heads and slidable in said sleeve, said chest provided with passages opening into the steam cylinder, said sleeve and piston heads provided with ports for registering at predetermined times with said passages to admit steam from the steam cylinder into said sleeve, said sleeve and chest provided with other ports and passages to deliver cushioning steam and initial movement imparting steam to said steam piston, and said sleeve provided with cut-away portions to permit steam from said first named passage to pass to and through said second named ports and passages, said steam chest further provided with ports and passages for admission of steam to and its exhaust from said cylinder, certain of the ports in said steam chest forming main steam ports which serve as steam supply ports for delivering operating steam to the cylinder at certain times during the cycle of operation of the valve gear and serve as exhaust ports to permit the exhaust of steam from the cylinder at other phases of the cycle of operation of the steam valve gear.

8. In a steam valve gear, a combination with a steam cylinder and a steam piston, of a steam chest, a distributing sleeve in said chest, a piston valve having opposed heads and slidable in said sleeve, said chest provided with passages opening into the steam cylinder, said sleeve and piston heads provided with ports for registering at predetermined times with said passages to admit steam from the steam cylinder into said sleeve, said sleeve and chest provided with other ports and passages to deliver cushioning steam and initial movement imparting steam to said steam piston, and said sleeve provided with cut-away portions to permit steam from said first named passage to pass to and through said second named ports and passages, said chest provided with main steam ports for delivering operating steam to said steam cylinder at certain times during the cycle of operation of the valve gear, said main steam ports having extensions thereon opening through reduced ports into the steam cylinder outwardly towards the ends of the cylinder from the entrance of the main steam ports into the cylinder whereby when the piston closes communication between the main steam ports and the steam cylinder a quantity of cushioning steam will be trapped between the piston and cylinder end which will gradually bleed out through one of said reduced ports.

9. In a steam valve gear, in combination with a steam cylinder and a steam piston, a valve chest provided with a bore, a reciprocating differential type piston valve in said bore, said chest and steam cylinder provided with ports and passages for delivery to and exhaust from them of operating steam, said chest and steam cylinder provided with an exhaust passage, said piston valve and said ports arranged whereby at one point in the travel of the valve both ends of said steam cylinder will be connected to said exhaust passage, said bore arranged and constructed to form steam-receiving chambers, said chest provided with passages to supply operative steam to said chambers whereby the piston valve will be prevented from stopping or remaining in inoperative position.

10. In a steam valve gear, in combination with a steam cylinder and a steam piston, a valve chest provided with a bore, a reciprocating differential type piston valve in said bore, said chest and steam cylinder provided with ports and passages for delivery to and exhaust from them of operating steam, said chest and steam cylinder provided with an exhaust passage, said piston valve and said ports arranged whereby at one point in the travel of the valve both ends of said steam cylinder will be connected to said exhaust passage, said bore arranged and constructed to form steam-receiving chambers, said chest provided with passages to supply operative steam to said chambers whereby the piston valve will be prevented from stopping or remaining in inoperative position, said steam chest provided with differential spaces oppositely disposed relative to said piston valve from said chamber, said piston valve counterbored and ported to admit steam to said differential spaces, and means on said piston valve for controlling delivery of steam to said differential spaces.

11. In a steam valve gear, in combination with a steam cylinder and a steam piston, a steam chest, a distributing sleeve in said steam chest, a piston valve having opposed heads and slidable in said sleeve, one of said opposed heads having greater area than the other, said steam chest sleeve and steam cylinder provided with ports and passages for delivery to and exhaust from them of operating steam, steam piston valve and ports arranged whereby at one point in the travel of the valve both ends of the steam cylinder will be connected to said exhaust passage, said distributing sleeve provided with a bore arranged and constructed to form steam-receiving chambers at opposite ends of said piston valve, said chest and sleeve provided with passages to supply live steam to said chambers whereby the piston valve will be prevented from stopping or remaining in inoperative position.

12. In a steam valve gear, in combination with a steam cylinder and a steam piston, a valve chest provided with a bore, a reciprocating differential type piston valve in said bore, said chest and steam cylinder provided with ports and passages for delivery to and exhaust from them of operating steam, said chest and steam cylinder provided with an exhaust passage, said piston valve and said ports arranged whereby at one point in the travel of the valve both ends of said steam cylinder will be connected to said exhaust passage, said bore arranged and constructed to form steam-receiving chambers, said chest provided with passages to supply operative steam to said chambers whereby the piston valve will be prevented from stopping or remaining in inoperative position, said chest having passages therein forming extensions of said steam supply passages and opening through reduced ports into the steam cylinder outwardly towards the ends of the cylinder from the entrance of said supply ports into the cylinder whereby when the steam piston closes communication between the supply passages and the steam cylinder a quantity of cushioning steam will be trapped between the piston and cylinder ends which will gradually bleed out through one of said reduced ports.

13. In a steam valve gear, in combination with a steam cylinder and a steam piston, a steam chest, a distributing sleeve in said steam chest, a piston valve having opposed heads and slidable in said sleeve, one of said opposed heads having greater area than the other, said steam chest sleeve and steam cylinder provided with ports and passages for delivery to and exhaust from them of operating steam, steam piston valve and ports arranged whereby at one point in the travel of the valve both ends of the steam cylinder will be connected to said exhaust passage, said distributing sleeve provided with a bore arranged and constructed to form steam-receiving chambers at opposite ends of said piston valve, said chest and sleeve provided with passages to supply live steam to said chambers whereby the piston valve will be prevented from stopping or remaining in inoperative position, said sleeve and chest provided with other ports and passages to deliver cushioning steam and initial movement-imparting steam to said steam piston, said sleeve provided with cutaway portions to permit steam from said supply passage to pass to and through said cushioning and imparting steam ports and passages.

JOHN A. LE CAIN.